United States Patent [19]
Valyi

[11] Patent Number: 5,419,866
[45] Date of Patent: May 30, 1995

[54] PROCESS FOR HEAT TREATING THERMOPLASTIC CONTAINERS

[75] Inventor: Emery I. Valyi, Katonah, N.Y.
[73] Assignee: PepsiCo Inc., Purchase, N.Y.
[21] Appl. No.: 32,636
[22] Filed: Mar. 17, 1993

Related U.S. Application Data

[63] Continuation-in-part of Ser. No. 972,770, Nov. 6, 1992, abandoned.

[51] Int. Cl.⁶ .................. B29C 49/18; B29C 49/64
[52] U.S. Cl. .................... 264/521; 264/529; 264/530; 425/526
[58] Field of Search ............... 264/520, 521, 529, 530, 264/25, 235, 342 R, 346, 230; 425/526, 530

[56] References Cited

U.S. PATENT DOCUMENTS

| | | | |
|---|---|---|---|
| 4,079,104 | 3/1978 | Dickson et al. | 264/25 |
| 4,233,022 | 11/1980 | Brady et al. | 425/525 |
| 4,260,567 | 4/1981 | Poppe et al. | 264/25 |
| 4,318,882 | 3/1982 | Agrawal et al. | 264/521 |
| 4,385,089 | 5/1983 | Bonnebat et al. | 264/529 |
| 4,482,518 | 11/1984 | Brady, Jr. | 264/523 |
| 4,836,971 | 6/1989 | Denis et al. | 264/521 |
| 4,871,507 | 10/1989 | Ajmera | 264/521 |
| 5,178,816 | 1/1993 | Suzuki et al. | 264/530 |
| 5,229,042 | 7/1993 | Denis et al. | 264/521 |
| 5,248,533 | 9/1993 | Sugiura et al. | 264/521 |
| 5,281,387 | 1/1994 | Collette et al. | 264/530 |

FOREIGN PATENT DOCUMENTS

| | | | |
|---|---|---|---|
| 155763 | 9/1985 | European Pat. Off. | 264/530 |
| 442836 | 8/1991 | European Pat. Off. | 264/521 |
| 58-004611 | 4/1976 | Japan | 264/523 |
| 54-103474 | 2/1978 | Japan | 264/346 |
| 55-146715 | 11/1980 | Japan | 264/523 |
| 62-030018 | 2/1987 | Japan | 264/530 |
| 2138735 | 10/1984 | United Kingdom | 264/521 |
| 94/06617 | 3/1994 | WIPO | 425/526 |

Primary Examiner—Catherine Timm
Attorney, Agent, or Firm—Bachman & LaPointe

[57] ABSTRACT

The process selectively crystallizes a molecularly oriented thermoplastic container composed of portions thereof with different degrees of orientation. Portions of the container are heat treated at temperatures suitable to crystallize said portions according to the degrees of orientation thereof wherein the heat treatment takes place in a heating environment on an unconfined container. The selectively crystallized container is then sized in a finishing means.

24 Claims, 7 Drawing Sheets

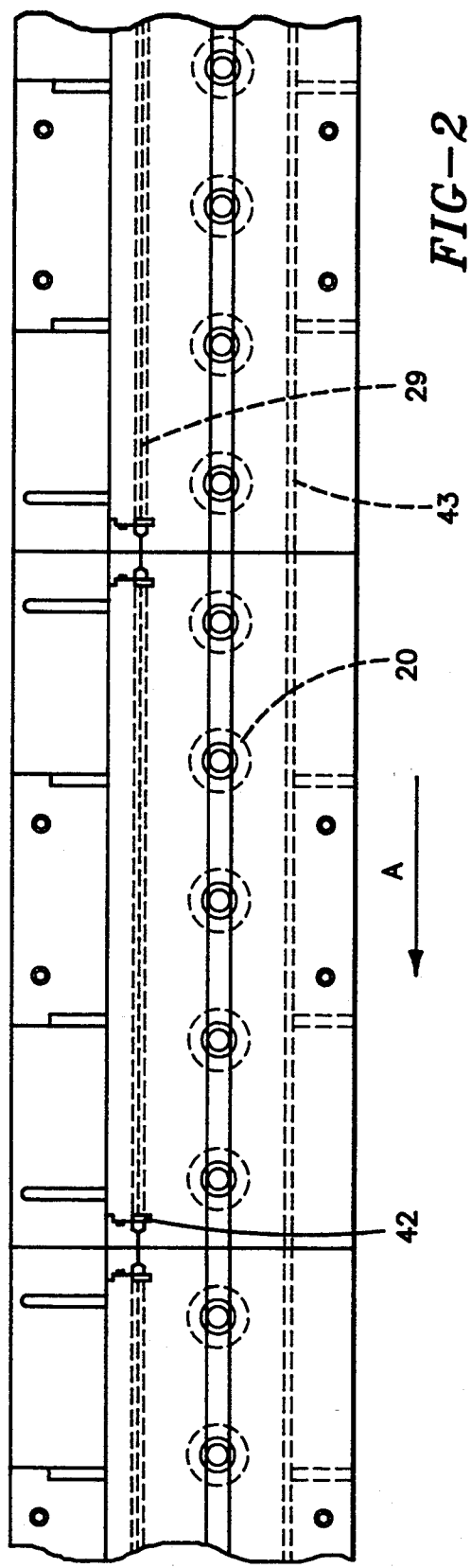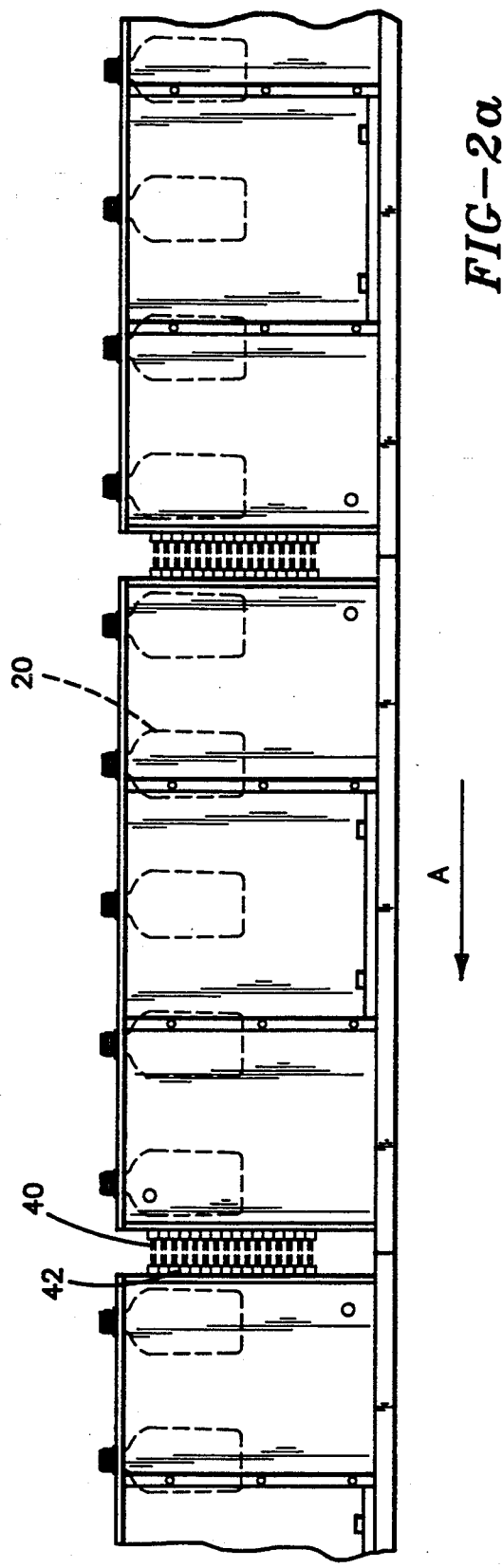

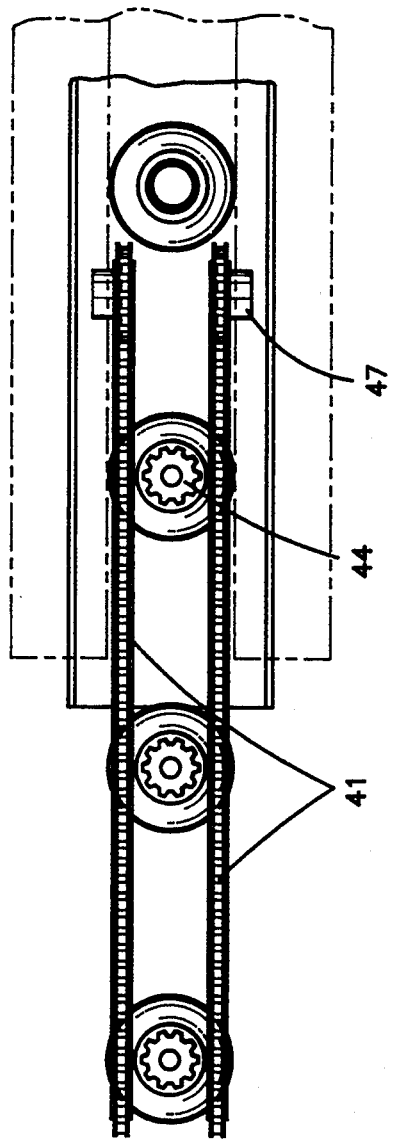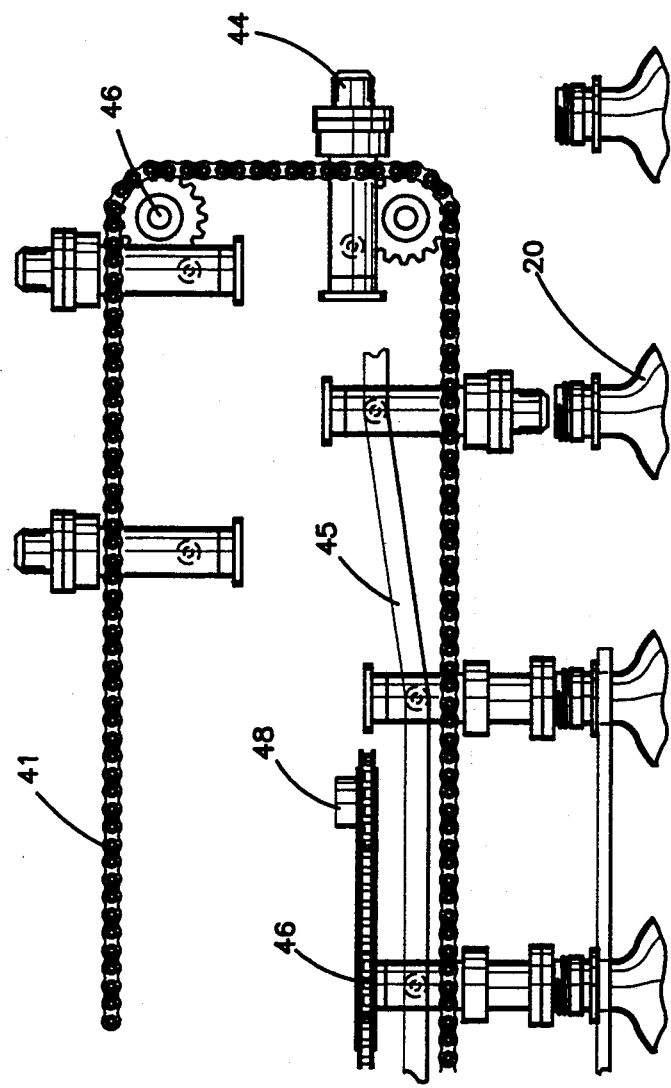
FIG-3
FIG-3a

PROCESS FOR HEAT TREATING THERMOPLASTIC CONTAINERS

CROSS-REFERENCE TO RELATED APPLICATION

This application is a Continuation-In-Part of application U.S. Ser. No. 972,770 for PROCESS FOR HEAT TREATING THERMOPLASTIC CONTAINERS, By Emery I. Valyi, Filed Nov. 6, 1992, abandoned.

BACKGROUND OF THE INVENTION

The present invention relates to a method for improving the properties of stretch blow molded thermoplastic containers, especially polyethylene terephthalate (PET), by heat treating to induce selective crystallization thereof.

It is known that the gas transmission impedance and the mechanical properties of PET improve with increasing degree of crystallization. The same properties are also improved by orientation, albeit to a different degree.

Crystallites forming from the amorphous phase of unoriented PET, as by heating, are relatively large spherules, while crystallites forming due to orientation or in oriented PET are finely dispersed. The index of light refraction of the large-spherulitic structure being different from that of the optically clear, amorphous matrix, opacity results. This is not the case for the finely dispersed phase and therefore the oriented PET articles remain clear in spite of high levels of crystallinity induced in them after orientation. Mechanically induced crystallization due to deformation is limited by the fact that PET embrittles as it crystallizes and therefore the deformation cannot be continued past the amount at which the brittleness is sufficient to preclude further deformation. As a practical matter, the amount of crystallinity in a container made according to commercial practice is usually between 18% and 25%. The resulting finely dispersed crystallites do not change effective transparency and, since they serve as nuclei in the course of subsequent additional crystallization that may be induced by heat treatment, such subsequently formed crystallites are finely dispersed as well. The present invention provides an efficient way to render PET containers transparent and haze-free in spite of their being substantially crystallized by a process that insures a high degree of orientation, e.g., by stretch-blow molding, and heat treating to crystallize.

PET containers for certain commodities are filled hot and they must be "heat-set". Crystallization is a by-product of heat setting, an operation intended to relieve the residual stresses within the biaxially oriented PET containers so that they may retain their shape when exposed to the temperatures of filling which are higher than the ones at which they were formed. This is accomplished by stress-relieving them at a temperature that is higher than the one to which they may be subsequently exposed, i.e., heat-setting. In most instances, that temperature is within the range capable of propagating crystallization and therefore, typically, heat-set, blow molded PET containers are crystallized beyond the amount due to deformation alone. Typical U.S. patents which illustrate this practice are U.S. Pat. Nos. 4,871,507, 4,913,945, 4,803,036 and 4,318,882.

Crystallization proceeds in PET at a rate corresponding to the temperatures at which it is induced, and quite rapidly at higher temperatures of heat setting. Also, crystallization of an amorphous matrix occurs during its mechanical deformation, as by stretch blowing of a largely amorphous preform into a container or bottle.

Given the practical limits of the amount of deformation (the degree of orientation) that can be imparted to a preform, thereby crystallizing some 25% of the original amorphous phase at best, heat-treatment must be resorted to if higher crystallinity, e.g., near 50% is to be obtained with the temperature as high as practicable, but, of course, below the melting point, and maintained for as long as economical production practice permits.

The rate of crystallization depends not only on time and temperature, but also on the amount of amorphous matrix that is already crystallized at a given moment. As a practical matter, some 45% or slightly more of the matrix may be crystallized within a reasonable processing time of a minute or less when starting with the level of crystallinity inherently present in a typical stretch-blown PET container.

The crystalline phase is considerably less pervious to gases than the amorphous phase. Also, gases dissolve less in the crystalline phase than in the amorphous phase and at a slower rate. The crystalline regions are denser than the amorphous ones and are stronger, but also brittler. In combination, these properties can provide a superior container to retain or exclude fluids, to avoid dissolving them in the container walls and to reinforce the structure. The quality of a container in these respects is measured in terms of its shelf-life, i.e., the amount of a specified time before it fails to preserve the integrity of its contents under normal conditions of use.

For example, in the case of a PET bottle for carbonated beverages, the shelf-life is largely given by the net loss of $CO_2$, which is the sum of losses due to transport through the bottle walls, the amount dissolved therein, and its escape into the space above the liquid level (the head space), due to its enlargement, i.e., creep under prolonged pressure, often aggravated by elevated ambient temperatures. Increased crystallinity will alleviate all three of these harmful effects.

However, transparency of the container is an important property of PET when used for beverage bottles, because the public finds it appealing, the same as in glass which PET replaces. Transparency is affected by crystallization, as indicated hereinabove.

Thus, when crystallizing the amorphous phase without having imposed thereon a certain molecular arrangement (as by deformation), comparatively large spherules will form which defract light and which reduce or eliminate transparency. The small, finely dispersed crystallites that form during deformation do not interfere with light transmission. The same is true of crystallites that form in addition to those already present due to deformation. Therefore, oriented parts of a bottle may be thermally crystallized close to 50% without significant loss of transparency, while the other parts will lose transparency in the decreasing amount of the deformation they have experienced.

It is important, therefore, to carefully balance the crystallinity and strength in the various portions of the container. A bottle must be clear where its contents can be seen, and it also must be impervious to $CO_2$ over a sufficient part of its surface to provide acceptable shelf-like, permeation being a function of the area. It must also exhibit creep resistance, and have high impact resistance.

The art shows no practical procedure to obtain a satisfactory balance of these properties. U.S. Pat. No. 4,233,022 shows a method for heat setting which obtains a limited crystalline morphology in stretch blow molded bottles through heating subsequent to blow molding by conduction in a confining mold, which is time consuming, inconvenient and above all, not suitable to control the process with the necessary precision. To heat the container so as to match the resulting amount of crystallinity against the amount of deformation its several portions have undergone is not possible with a device, such as a mold, that transfers heat into the container by conduction. Design and fabricating limitations of a mold allow for no more than comparatively coarse definition of heating zones, even if the best care is taken, for example, to insulate sections of the mold that are individually heated as by a circulating fluid in the normal manner, as taught in U.S. Pat. No. 4,233,022. This is particularly evident at transition zones from the body to the neck over the shoulder, or from the body downward into the base proper. In these regions, orientation changes from a maximum to near zero, and increasing haze develops unless heating is accurately aimed and its intensity appropriately metered. To accomplish this with a zone-controlled mold is difficult at best, and even at limited levels of effectiveness expensive and time consuming.

Heating by radiant or aimed convective heat transfer is preferable, because it can be accurately metered according to preselected zones and locations. However, neither radiant, nor convective heating is possible in the confined environment of a mold, which was partly considered to be necessary according to the art because, it was found, the distortion of the oriented article upon heating above the temperature of orientation may be counteracted by the application of internal pressure, so long as that temperature is no more than enough for heat setting.

The above distortion occurs for two reasons, the relief of residual stresses in the oriented article, and shrinkage due to crystallization. Residual stresses arise, as is well known, in the course of forming the article in a mold that precludes free thermal shrinkage as said article cools from the temperature at which it is formed to that of the mold in which it is formed. Whenever the same article is once again heated, to or above said temperature, but without confinement, the residual stresses are relieved and the shape of the article changes. Shrinkage due to crystallization is of a different nature: the crystalline phase is denser than the amorphous one and therefore, the dimensions of the article will be reduced while it crystallizes. Thus, it is known that density of amorphous $PET = 1.333$ g/cm$^3$, while that of a crystal unit cell is calculated to $= 1.455$ g/cm$^3$ (Ref. U.S. Pat. No. 2,968,065). In a given article, the actual shrinkage of its specific volume will be between these limiting values, i.e. appr. 9% max. and 0%, depending on the degree of crystallization.

Accordingly, in a typical case, the total distortion does not set in at the same time. Instead, stress relief occurs upon heating first, which changes the shape, but not the density and therefore the specific volume, and only then does the distortion due to shrinkage of that volume set in, the more as crystallization progresses.

The change in shape due to stress relief, in contrast with that due to increased density (crystallinity), is readily corrected, as by re-blowing in a mold. The change in shape due to crystallization may be corrected as a practical matter only within certain limits, i.e. the specific volume of the original article may be restored, but only at some sacrifice of its original shape.

In current practice, which is largely confined to heat-setting, as above explained, the dominant effect of heating is stress relief, while only modest crystallization occurs. In contrast, the aim here is maximum crystallization, the deformation of which cannot be offset as before.

Accordingly, it is found that heating under pressure is no benefit, but a hindrance, and that it becomes possible to use radiant or convective heat transfer, which is far more efficient and controllable than conductive heating. Radiant heating, which is preferred, is usually accomplished by means of electric resistance heating rods. Convective heating may be effected by means of a heated gas aimed at the container from orifices spaced according to a suitable pattern. Naturally, for effective radiant or convective heating, the article to be heated must be kept unconfined, at a predetermined distance from the heating means. Nor is it useful, in the case of a container, to keep it under internal pressure, which is necessary in the case of conductive heating by means of a mold.

To obtain the final shape and predetermined contained volume of the oriented container. The heated and thereby distorted shape is re-shaped, usually re-blown in conventional ways, using a suitable fixture.

It is, therefore, a principal object of the present invention to provide an efficient process for heat-treating thermoplastic containers, especially of polyethylene terephthalate (PET), wherein stretch blow molded containers are selectively crystallized according to the amount of orientation of its individual regions while preserving substantial transparency throughout.

It is a still further object of the present invention to provide a process as aforesaid which is effective, expeditious and convenient to use on a commercial scale.

It is a still further object of the present invention to provide a process as aforesaid which obtains improved containers having greatly improved properties.

Further objects and advantages of the present invention will appear hereinbelow.

SUMMARY OF THE INVENTION

In accordance with the present invention, the foregoing objects and advantages are readily obtained.

The process of the present invention applies a crystallizing heat treatment to thermoplastic containers. The present process selectively crystallizes a molecularly oriented, thermoplastic container, as a stretch blow molded or thermoformed container, and composed of portions thereof with different degrees of orientation, by heat treating portions thereof at temperatures suitable to crystallize said portions according to the degree of orientation thereof, wherein the heat treatment takes place in a heating environment on an unconfined container, and wherein the heat treatment results in distorting and shrinking the specific volume of the container, and sizing said selectively crystallized container in a reforming means to conform the container to a final shape. An oriented thermoplastic container, especially PET, is thus heat-treated, said container including a bottom portion, side walls extending upwardly from the bottom portion, a shoulder portion extending upwardly from the side walls and a neck portion, wherein each of said portions exhibits its own pattern of orientation different from the others; placing said container in a heating environment, such as a heating tunnel or heating station, to expose it to an array of heating means adapted to selectively crystallize said portions of the container by heating them corresponding to their amount of orientation, some portions thereof desired to be crystallized more than others, while maintaining still other portions of the container unheated. Thus, the side walls may be uniformly heated, the neck and base unheated, and the shoulder heated progressively, and wherein the side walls of the container are unconfined during travel through the heating tunnel. The heated portions having shrunk and reformably deformed due to heating, the thus crystallized container is sized as by pressurizing in a sizing fixture by conforming the deformed portions of the container to the sizing fixture and thereby to conform them to a desired final shape. The container may move continuously or intermittently through the tunnel. The PET that is to be thus heat-treated is made by known means such as injection or extrusion blow molding or thermoforming, all of which produce an oriented blow molded PET container. The neck and other non-oriented parts of the container, e.g., the bottom of the container, are kept from being heated during transit through the tunnel if loss of transparency thereof is to be avoided. The heating in the tunnel may be by radiant or convective heating means, and differential heating zones may be used.

The neck and usually the bottom portion of the container include unoriented portions which may require actual cooling during transit through the heating tunnel. Side walls may be heated, for example, at a temperature between about 175° to 230° C., and the residence time in the heating tunnel at temperature may be from 2 to 30 seconds. The container is generally reformed within 5 seconds of leaving the tunnel. In the preferred embodiment, the neck and bottom of the container are outside the heating zone during transit through the heating tunnel in order to prevent heating thereof and the shoulder starting at the neck is heated increasingly as it approaches the body. Also, the container is preferably rotated as it passes through the heating tunnel in order to insure uniform heating thereof.

Other features of the present invention will appear hereinbelow.

BRIEF DESCRIPTION OF THE PREFERRED EMBODIMENTS

The present invention will be more readily understandable from a consideration of the following illustrative examples, wherein:

FIGS. 2 and 2a are top and sectional views of the heat-treating tunnel with the bottles located therein;

FIGS. 3 and 3a are top and side views of the means for conveying bottles through the tunnel;

DETAILED DESCRIPTION OF THE PREFERRED EMBODIMENTS

While the present invention preferably applies to polyethylene terephthalate (PET), other crystallizable thermoplastic materials are readily contemplated herein, such as polycarbonates and polyolefins.

Figure 1:
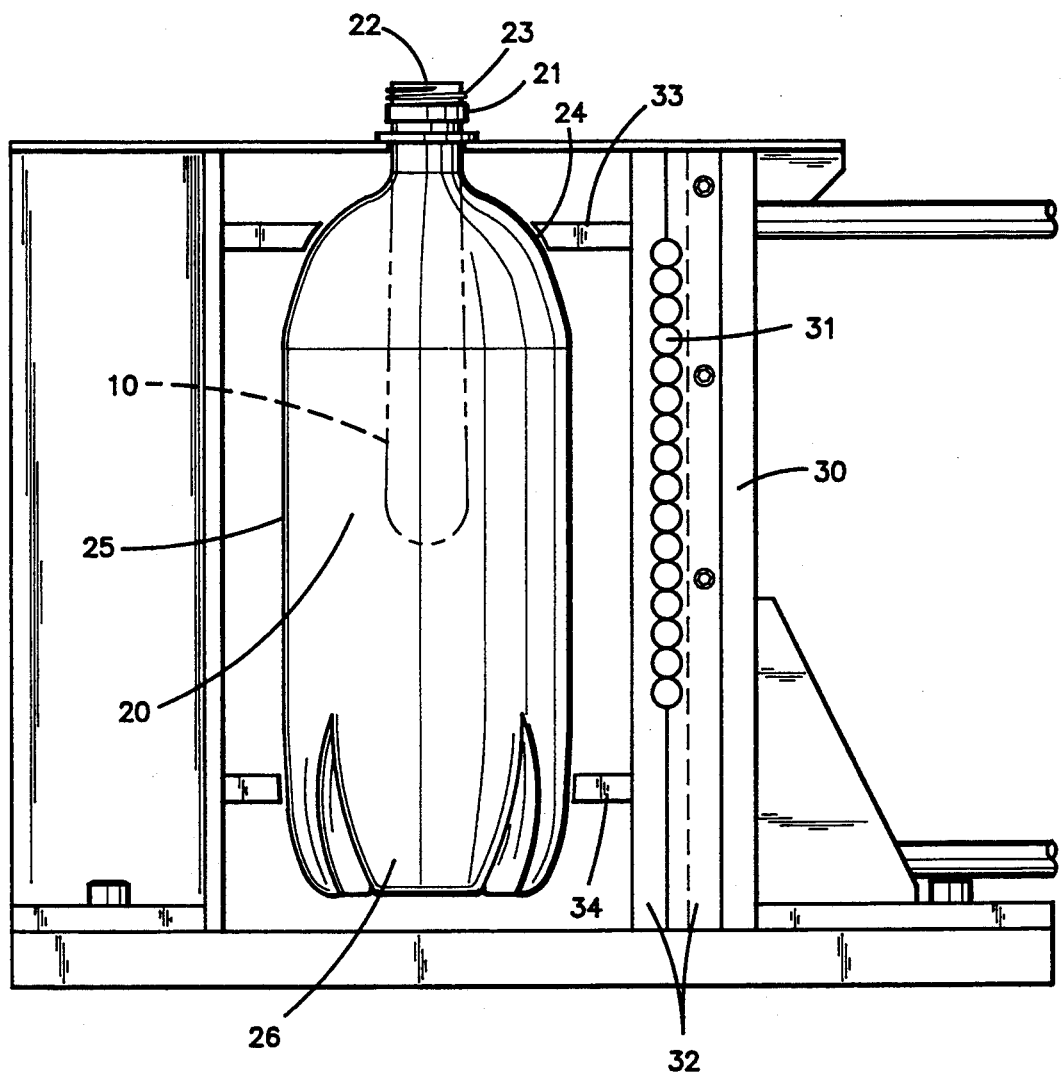
FIG. 1 is an elevation of a hollow plastic container located in a tunnel for heat-treatment, including the parison or preform from which it is prepared shown in phantom.

FIG. 1 shows a representative container 20, a bottle, that has been made by stretch-blowing a preform 10 shown in dotted lines, by conventional blow molding under conditions inducing bi-axial orientation and a moderate amount of crystallinity according to the orientation of its several portions, as is conventional in the art. Container 20 has a neck portion 21 defining an opening 22 and including external threads 23. Shoulder portion 24 depends from the neck portion, container body portion 25 depends from the shoulder portion and container bottom 26 depends from the container body portion, as shown in FIG. 1.

The container 20 of FIG. 1 was previously and independently molded by inserting a heated preform, such as the preform shown in dotted lines in FIG. 1, into a cooled blow mold, stretched axially to extend its length while air pressure was applied to expand the preform into the shape of said blow mold and to cool it therein, all as known in the art. It can be readily seen from FIG. 1 that the several parts of the preform that are deformed, are deformed to different extents as they are stretch blown into the shape of the container, and that the latter will contain appreciable residual stress.

FIG. 1 also shows a sectional view of the tunnel 30 into which the previously made, bi-axially oriented container 20 has been transferred for heat-treatment, as from a storage facility or conveyor. Heat treatment is effected by radiant heaters 31, adjustably held by brackets 32 so that their distance and axial location relative to the container 20 may be adjusted for the desired amount of heat transfer at the corresponding locations of the container. The amount of radiant heat from each heater may be individually controlled by known means (not shown), e.g., potentiometers. In place of radiant heaters 31, a line of nozzles may be arranged instead of each radiant heater, not shown, each set of said nozzles communicating with a manifold to conduct heated fluid therethrough, to impinge on corresponding parts of container 20, whereby the temperature of the fluid emanating from each manifold is individually adjustable.

In order to protect the neck portion 21 from being heated, the same is kept outside the heating environment of the tunnel, as shown in FIG. 1. Insulating baffles 33 and 34 are provided to avoid heating portions of the bottle in addition to neck 21, said baffles being adjustable in the axial direction of container 20, whereby the portions so protected are the ones in which opacity would result due to heating. Typically, these are the portions that have been deformed less than approximately 2-fold in the course of expanding the preform into the container shape, as above. To further preclude undesired heating of parts of shoulder 24 and bottom 26, the space above and below baffles 33 and 34, respectively, may be flooded with cold air (not shown).

The degree of orientation in shoulder 24 increases from the neck 21 downward, with increasing dimensions of the shoulder. In order to crystallize shoulder 24 to the greatest extent possible without inducing opacity, any heaters 31 that are juxtaposed the shoulder are regulated by adjustment of intensity or distance from the shoulder.

PET exhibits shrinkage upon crystallization, some 3% at 45% crystallization, as the specific volume of the crystalline and amorphous phases differs by approximately 9%. The containers to be heat-treated must be unconfined during passage through the tunnel in order to be heated by radiant or convective heat transfer. Even with a slight amount of air pressure in the container while it traverses the tunnel, which is within the scope of the present invention, the side walls, which must remain unconfined, will shrink, but only after a brief lapse of time. Therefore, the heat-treated container will deform and due to the geometry of that deformation the length and configuration of the container will be altered, while the dimensions of the untreated parts will remain unchanged. To correct these dimensional changes, the container must be reformed to restore it to its original shape or to a desired final shape.

The traverse of containers through tunnel 30 may be continuous or intermittent, depending on the transport means chosen, both being conventional. If intermittent, the temperature of the container being heat-treated will depend not only on the distance and intensity of the heaters, as above, but also on the time it is at rest within the tunnel. Continuous operation is shown on FIGS. 2, 2a, 3, and 3a, by way of illustration.

Referring now to FIGS. 2 and 2a, showing a tunnel for continuous operation, the residence time is determined by the length over which heaters 40 are placed and the speed at which the containers 20 are transported in the direction of arrow A. The containers are usually subjected to operations, such as the application of labels, after heat-treatment and the rate of travel through the tunnel is preferably adjusted to the subsequent operation to avoid in-process storage. Accordingly, the tunnel is designed with a length corresponding to the desired rate of traverse therethrough. FIGS. 2 and 2a show a section of that length in which containers 20 are conveyed by the chain 41 shown in FIG. 3. During their travel, they are exposed to radiant heaters 40, arranged in sections of a length corresponding to the length of commercially available heaters which are mounted in connector brackets 42, each of which being individually and controllably connected to a source of power, not shown, via electrical connections 29. According to FIG. 2, heaters 40 are arranged along only one side of the tunnel, while a set of mirrors 43 is arranged along the opposite side. In this manner, a satisfactory transfer of heat into the containers is accomplished at reduced expense compared with mounting a second battery of heaters in place of the mirrors, which may, however, be done if substantial energy output is necessary. For greater efficiency and to save space, the tunnel may be arranged to convey the containers along the legs of a "U", whereby the heaters are placed in the center-plane between the two rows, with mirrors placed on the opposite side. In this manner, the functional length of the tunnel is halved.

FIG. 3 shows the arrangement of transport chain 41 and the attachment thereto of containers 20 by means of expansion plugs 44, a multiplicity of which is affixed to the chain. Plugs 44 are adapted to be inserted into the containers' necks at fixed distances and engage the necks when suitably aligned, at which time they are mechanically expanded, as in an expanding mandrel, or other known device. Insertion of the plugs necessitates the movement thereof axially into the necks. That movement is provided by camrail 45 shown in FIG. 3a. In addition to coupling the containers to transport chain 41, plugs 44 are also used to rotate them as they traverse parallel to the heaters. This is accomplished by drive belt 46 which engages the housing that carries plugs 44. Separate drives by motors (not shown) are provided to move chain 41 and belt 46 by means of sprockets 47 and 48, respectively.

Figure 4:
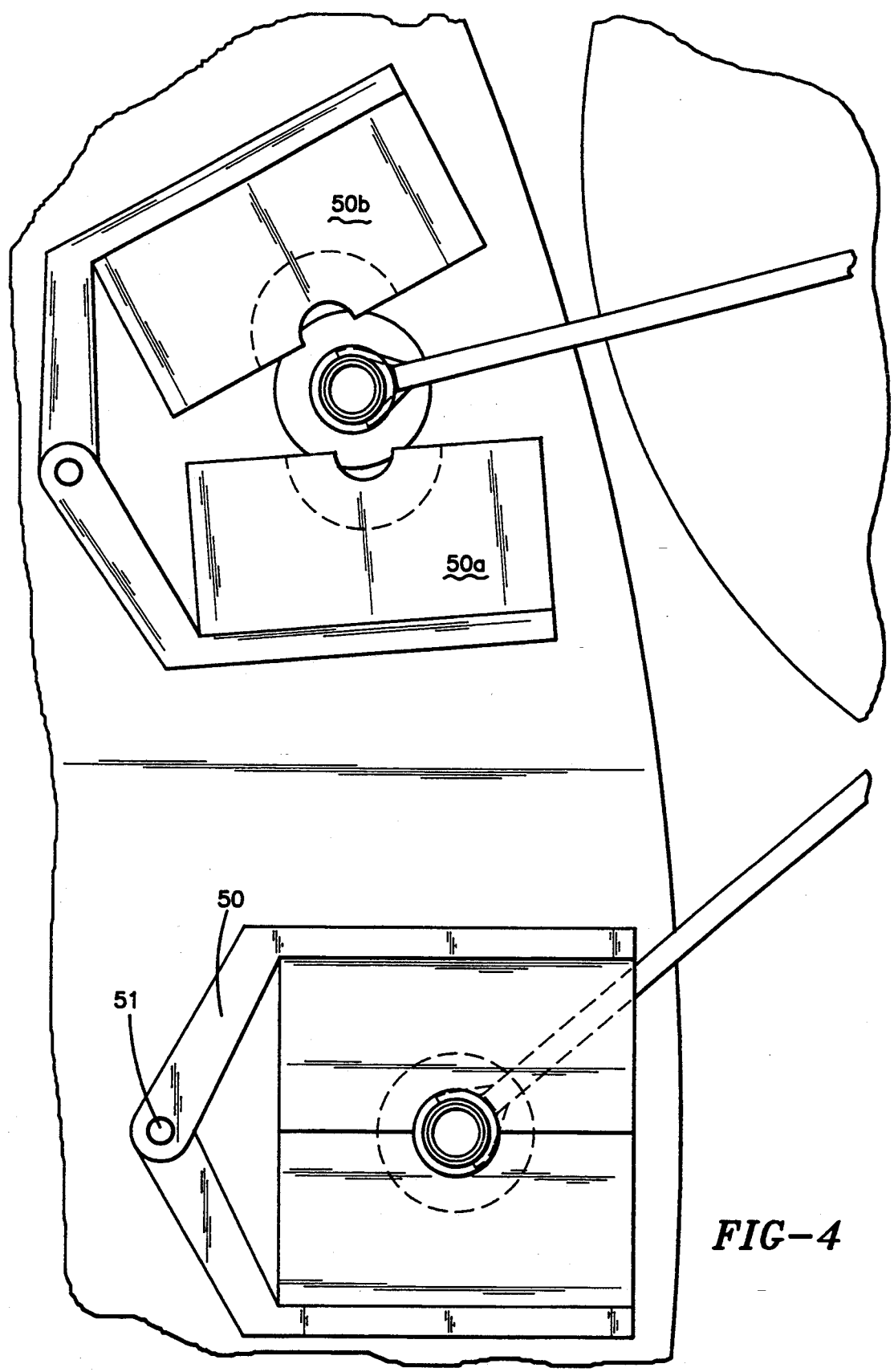
FIG. 4 is a schematic elevation of a sizing fixture.

Upon completion of their traverse through the heat-treating tunnel, the containers are rapidly transferred to sizing fixture 50 shown in FIG. 4. It is well known that highly crystalline PET for example is difficult to form and the conditions under which it is to be formed must be very closely controlled. Therefore, it is important that the container be reformed promptly after leaving the heat treating tunnel, preferably within 5 seconds of leaving the tunnel. The sizing fixture 50 shown in FIG. 4 consists of two halves movable into closed and open positions by means of hinge 51, or by any other suitable means. The two halves 50a and 50b form, when closed, a space corresponding to the desired final shape of those regions of the container which were heat-treated, and which will have shrunk and deformed due to that treatment. The freshly treated bottles are quickly encased within that space while still at a deformation temperature and pressurized to conform them to the sizing fixture, which is cooled by conventional means, not shown. They are kept there until cold enough to maintain the dimensions determined by the fixture, at which time the specified contained volume of the bottle is fixed.

Figure 5:
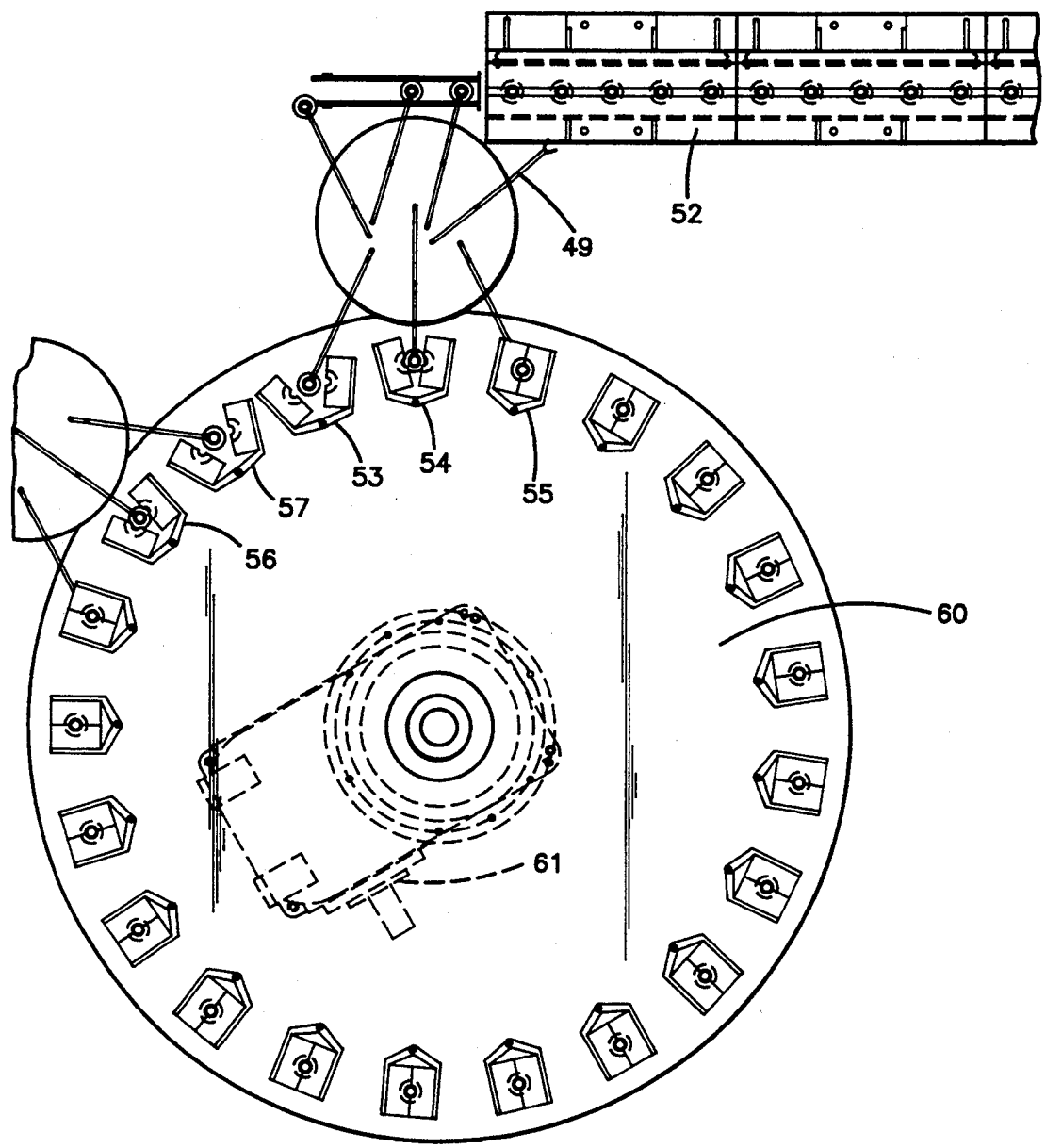
FIG. 5 is a schematic top view of a table with fixtures of FIG. 4 thereon, with transfer means from the tunnel.

FIG. 5 shows the system in which containers emerging from tunnel 52 are transferred by means of conventional grippers 49 into sizing fixtures mounted on turntable 60 which is rotated at a speed corresponding to the rate of emergence of containers from tunnel 52, driven by a motor over transmission 61. Fixture 53 is shown in the open position, ready to be closed around a freshly delivered container, fixture 54 is shown in the process of being closed, and fixture 55 and the subsequent fixtures around the table up to fixture 56 are shown closed, containing heat-treated containers kept under pressure as they cool. Fixture 56 is in the process of being opened and a container is being removed by gripper means from fixture 57 which is fully opened, for transfer to storage or a next operation, such as labelling, as required.

Figure 6:
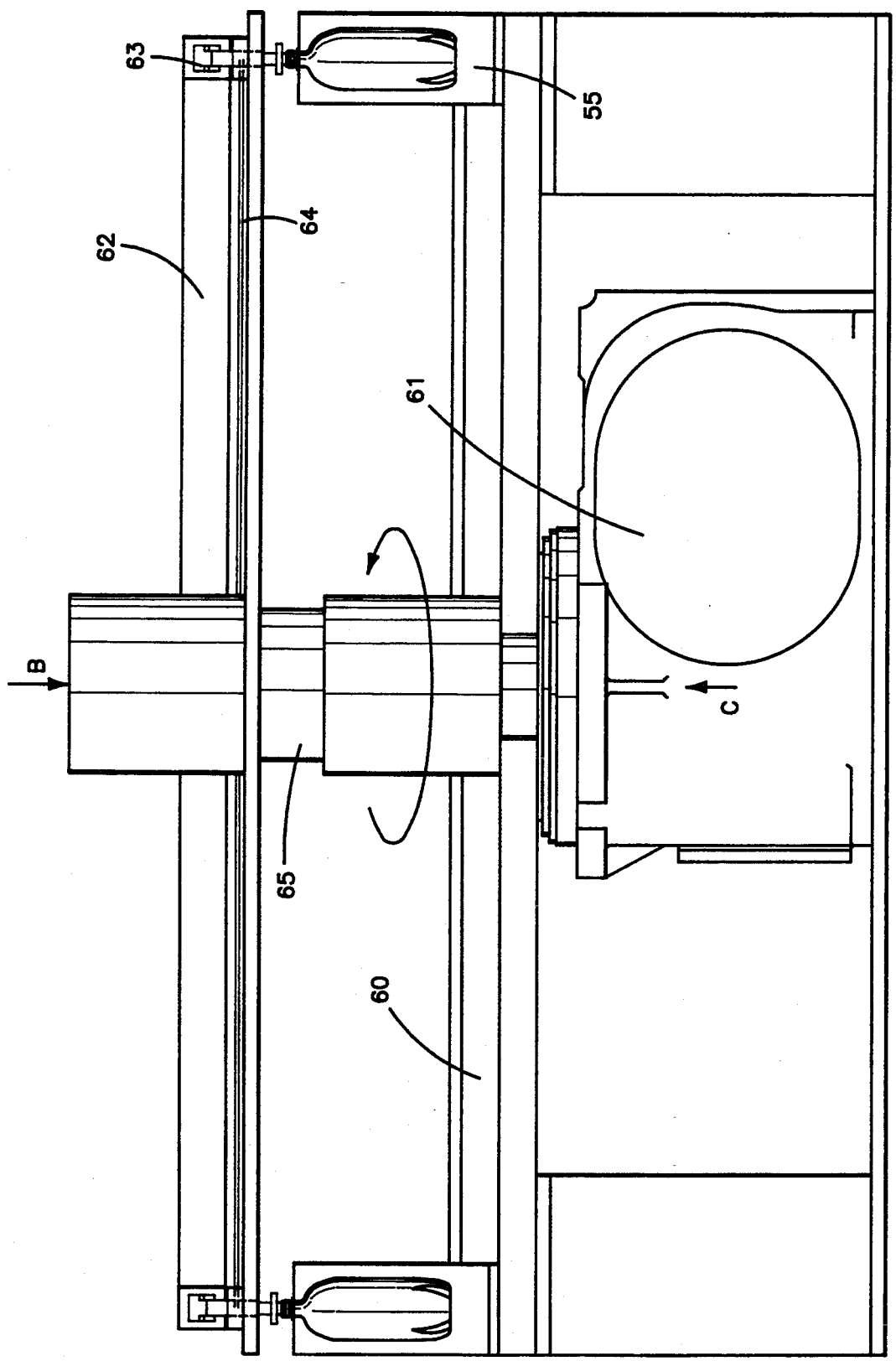
FIG. 6 is a schematic side view of the table of FIG. 5.

FIG. 6 shows table 60 carrying fixtures 55 containing containers after heat-treatment. It is noted that the fixtures, as shown in FIG. 6 appear to encompass the entire container, it being noted that in actual practice they surround only those portions which would inflate out of shape without such constraint, i.e., the parts of the container that were actually heated in the tunnel, plus a support at the base. Pressure is applied by means of assembly 62 rotating synchronously with table 60. Compressed air is conducted in channel 64 from its entry at arrow C into the drive shaft 65, to capping cylinder 63 which causes a valve-plug to enter the neck of the container, as shown, the application of pressure being initiated and discontinued at the individual stations by conventional valving mechanisms, not shown. In order to cool the fixtures 55, cooling fluid may be circulated in them, entering at arrow C, and conventionally distributed through channels to the individual fixtures. By careful control of heat transfer at the various location of the container following a heating protocol adapted to the orientation history of the container, as observable from its shape and that of the preform from which it was made, the container is improved only in the regions in which this can be most effectively done without damaging the rest, as by loss of transparency, and in a convenient and expeditious manner.

Figure 7:
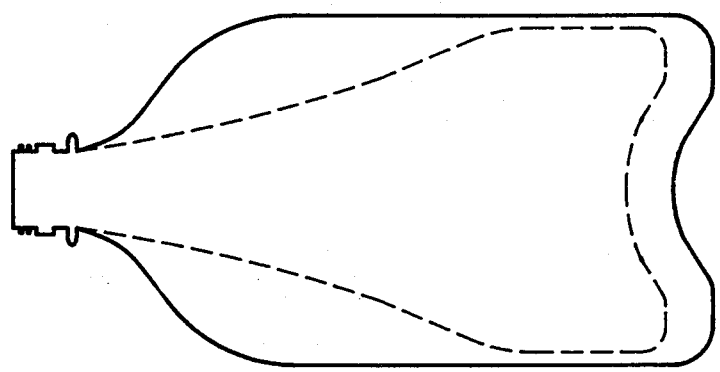
FIG. 7 is a diagrammatic view of the container to be crystallized compared to the shrunken, crystallized container.

As indicated hereinabove, the container undergoes considerable shrinkage in consequence of crystallization, the theoretical maximum density of 100% crystallized PET being some 9% greater than that of amorphous PET. Thus, appreciable deformation of the original container takes place, which naturally is the reason for reforming or sizing the container after crystallizing. FIG. 7 diagrammatically shows an original container (solid line) and a container deformed after crystallization of the entire container except the neck region (dashed line). It can be seen that the diameter tends to diminish increasingly upward, particularly if the bottom is unheated and therefore remains substantially unchanged. At the same time, longitudinal shrinkage occurs, adding to the total reduction of the containers contained, i.e. internal volume.

In attempting to restore the desired internal volume, the diameter or circumference of the shrunken container is readily increased, but not its length. This is the consequence of the fact that the axial stress in a cylindrical vessel under internal pressure, as is applied to reform or size the container in a mold, is one-half of the tangential stress in the container wall. Therefore, upon applying reforming pressure the shrunken bottle will expand radially as far as the reforming or sizing fixture (i.e., the mold) will permit, and only then could it stretch axially. However, at that time the wall will have cooled considerably, imparting great resistance to deformation, and stretching becomes difficult, if not impossible.

Figure 8:
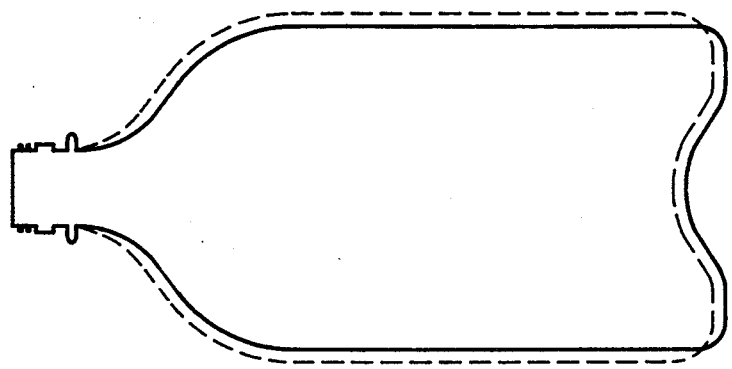
FIG. 8 is a diagrammatic view of the container to be crystallized compared to a sized container.

In accordance with the present invention, to recover the intended internal volume, it is preferred to give the reforming or sizing fixture or mold a larger diameter to compensate for the loss in length. This is shown in FIG. 8 where the original container is shown in solid lines and the sized or reformed container is shown in dashed lines. Although the internal volume of the original container and the reformed container can be made to be substantially the same, the dimensions are measurably different. The visual effect is minimal and acceptable. For example, for a container with an initial body diameter of 61 mm, the reformed container diameter for equal volume will be 4 mm greater, i.e., 2 mm on each side, without discernible esthetic impact.

An alternate embodiment of this invention aims at better controlling the shrinkage of the original container, at gaining flexibility in the shaping of the reformed container, and at rendering the process of manufacturing the crystallized bottle easier and more economical than normal practice permits.

According to previous practice, container 20 is molded by inserting a heated preform 10 shown in FIG. 1 into a blow mold, stretched axially to extend its length while air pressure was applied to expand the same into the shape of a blow mold.

As explained before, appreciable stresses are thereby retained in the resulting bottle which are released when heating the same to crystallize, with attendant irregular distortion of the shape. This may be minimized according to this embodiment by expanding preform 10 in free air, i.e. without confinement within a mold while internal pressure is being applied to stretch and blow it. Such bi-axial expansion of the preform will occur even without using a stretch-rod as is normally the case. The preform expands until its walls will have cooled enough and gained enough strength due to orientation to preclude further expansion. the stresses thus remaining in the expanded shape are less than otherwise, and the deformation during heating is therefore better controllable. Also, the resulting shape may be made as long as the preform shape permits. Without using a blow mold, a bottle shape may be produced whose length will shrink to a predetermined dimension, obviating the difficult task of stretching the crystallized shape, all with minimum residual stress.

Figure 9:
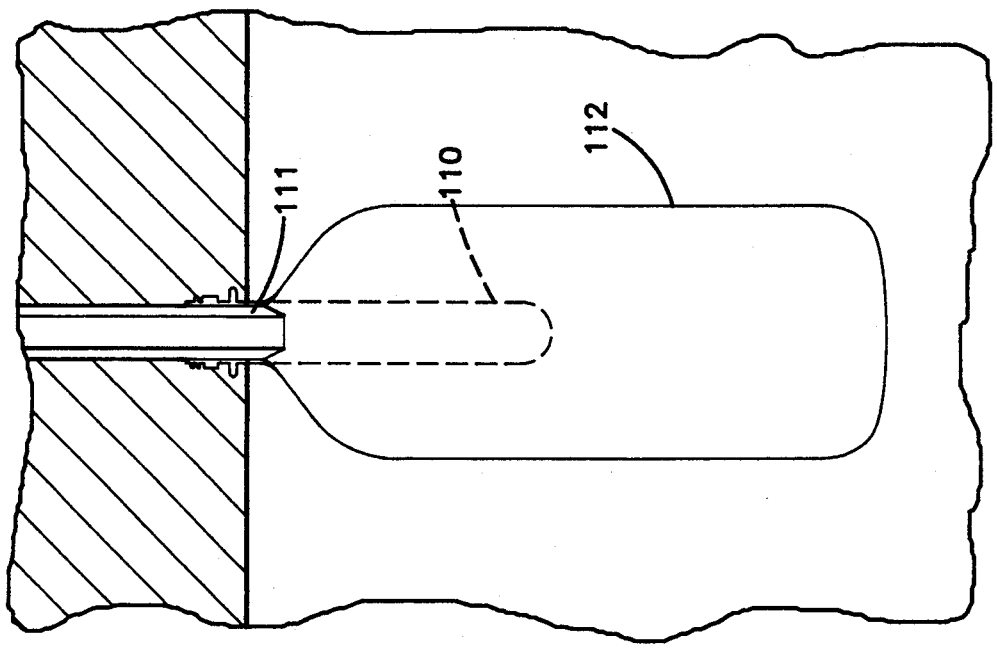
FIG. 9 is an elevation showing the formation of a molecularly oriented container by free expansion without a confining mold.

Thus, in accordance with the present invention, the initial mold set is omitted and the entire process performed using a single blow mold set, namely, the final sizing or reforming fixture. In place of the first mold set or initial blow mold, the heated preform 110 (shown in dashed lines in FIG. 9) is pressurized via pressure nozzle 111 without confining same in a mold and expanding it unrestricted in free air. Naturally, a measured preselected pressure is used to expand the preform. The resultant container 112 is a molecularly oriented thermoplastic container which then may be readily processed in accordance with the present invention to obtain a sized container having a final desired configuration. It is well known that, provided the preform has constant wall thickness and temperature distribution at the time of its deformation, it will assume the shape of a bottle with a hemispherical bottom as shown in FIG. 9, which may be heated to the crystallizing temperature and then formed into the desired final shape in accordance with the present invention.

In accordance with the present invention, the process may be carried out continuously as aforesaid using the heating tunnel, or intermittently in separate steps as for example in accordance with the apparatus and procedure shown in U.S. patent application Ser. No. 764,911, by Emery I. Valyi.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. Process for preparing thermoplastic containers which comprises:
   providing a molecularly oriented, thermoplastic container including a bottom portion, a body having side wall portions extending upwardly from the bottom portion, and a shoulder portion extending upwardly from the side wall portions, each of said portions exhibiting its own pattern of orientation different from the others, wherein the container has a side wall circumference and length;
   selectively crystallizing said container by heat treating portions thereof at temperatures suitable to crystallize said portions according to the degrees of orientation thereof, wherein the heat treatment takes place in a heating environment on an unconfined container wherein said container is moved through a heating station with the side walls and bottom portion thereof unconfined during movement therethrough and wherein the side wall portions shrink with at most a slight amount of air pressure in the container and wherein the heat treatment results in shrinking the container;

sizing said selectively crystallized container in a reforming means to conform the container to a final shape under internal pressure; and wherein the molecularly oriented thermoplastic container is prepared by expanding a preform into the shape of said molecularly oriented container with portions thereof thereby being deformed less than two-fold, and including the step of maintaining substantially unheated and maintaining transparency in the selectively crystallizing step unoriented portions of the molecularly oriented container and those that have been deformed less than two-fold in the course of expanding the preform to form the molecularly oriented container, wherein the side wall portions are heated, and an uppermost portion of the shoulder portion is unheated and the shoulder portion is heated increasingly as it approaches the side wall portion, and wherein the bottom portion is substantially unheated.

2. Process according to claim 1 wherein the molecularly oriented container includes a neck portion extending upwardly from the shoulder portion.

3. Process according to claim 1 including the step of sizing the selectively crystallized container so that the side wall circumference of the sized container becomes greater than the side wall circumference of the molecularly oriented container and so that the container length of the sized container becomes shorter than the container length of the molecularly oriented container.

4. Process according to claim 1 wherein said expanding, selectively crystallizing, and sizing steps take place sequentially.

5. Process according to claim 1 wherein the reforming means is a sizing fixture and including the step of pressurizing the selectively crystallized container to conform to the configuration of the sizing fixture.

6. Process according to claim 1 wherein the thermoplastic is polyethylene terephthalate.

7. Process according to claim 1 wherein the side walls of the container are heated to a temperature between about 175°–230° C. for from about 2 to 30 seconds in the heating environment.

8. Process according to claim 2 including the step of protecting the neck, at least a portion of the shoulder, and bottom of the container from the heating environment while in the heating environment.

9. Process according to claim 1 including the step of rotating the container while in the heating station.

10. Process according to claim 1 wherein said container is reformed within 5 seconds of leaving said station.

11. Process according to claim 1 wherein molecular orientation of said container is obtained by stretch blow molding.

12. Process according to claim 1 wherein molecular orientation of said container is obtained by thermoforming.

13. Process according to claim 1 wherein the molecularly oriented thermoplastic container is formed by stretching and expanding a preform in the absence of a confining mold.

14. Process for preparing thermoplastic containers which comprises:
providing a molecularly oriented, thermoplastic container including a bottom portion, a body having side wall portions extending upwardly from the bottom portion, and a shoulder portion extending upwardly from the side wall portions, each of said portions exhibiting its own pattern of orientation different from the others, wherein the container has a side wall circumference and length;

selectively crystallizing said container by heat treating portions thereof at temperatures suitable to crystallize said portions according to the degrees of orientation thereof, wherein the heat treatment takes place in a heating environment on an unconfined container and wherein the side wall portions shrink with at most a slight amount of air pressure in the container and wherein the heat treatment results in shrinking the container;

sizing said selectively crystallized container in a reforming means to conform the container to a final shape under internal pressure; and wherein the molecularly oriented thermoplastic container is prepared by expanding a preform into the shape of said molecularly oriented container with portions thereof thereby being deformed less than two-fold, and including the step of maintaining substantially unheated and maintaining transparency in the selectively crystallizing step unoriented portions of the molecularly oriented container and those that have been deformed less than two-fold in the course of expanding the preform to form the molecularly oriented container, including the step of preparing the molecularly oriented thermoplastic container by expanding a preform in free air in the absence of a confining mold and in the absence of a stretch rod.

15. Process according to claim 14 wherein said expanding, selectively crystallizing, and sizing steps take place sequentially.

16. Process according to claim 14 wherein the reforming means is a sizing fixture and including the step of pressurizing the selectively crystallized container to conform to the configuration of the sizing fixture.

17. Process according to claim 14 wherein the thermoplastic is polyethylene terephthalate.

18. Process according to claim 14 wherein the side walls of the container are heated to a temperature between about 175°–230° C. for from about 2 to 30 seconds in the heating environment.

19. Process according to claim 14 wherein the molecularly oriented container includes a neck portion extending upwardly from the shoulder portion.

20. Process according to claim 19 including the step of protecting the neck, at least a portion of the shoulder, and bottom of the container from the heating environment while in the heating environment.

21. Process according to claim 14 including the step of rotating the container while in the heating station.

22. Process according to claim 14 wherein said container is reformed within 5 seconds of leaving said station.

23. Process according to claim 14 wherein molecular orientation of said container is obtained by stretch blow molding.

24. Process according to claim 14 including the step of sizing the selectively crystallized container so that the side wall circumference of the sized container becomes greater than the side wall circumference of the molecularly oriented container and so that the container length of the sized container becomes shorter than the container length of the molecularly oriented container.

* * * * *